Patented Nov. 16, 1943

2,334,270

UNITED STATES PATENT OFFICE 2,334,270

PLYWOOD BINDER

Edwin C. Knowles and Frederic C. McCoy, Beacon, N. Y., assignors to The Texas Company, New York, N. Y., a corporation of Delaware No Drawing. Application November 19, 1941,
Serial No. 419,736

5 Claims. (Cl. 106—145)

Our invention relates to casein compositions, such as adhesives, paints, molding and extruding compositions, and the like, which are adapted for the production of solid plastic films or other bodies.

Numerous types of casein compositions which are adapted for the production of solid plastic forms are extensively used at the present time. Casein is particularly desirable for use in many compositions in view of the water resistance of the final products obtained from such compositions. Casein, however, is quite expensive when compared to numerous other plastic or bonding agents, and there has therefore been a demand for a cheap filling agent or extender which could be employed in casein compositions. Up to the present time, however, the materials which have been tried for this purpose have been found to be undesirable, particularly in their effect in weakening the products produced from the casein compositions and in reducing their water resistance and durability.

We have now found that very satisfactory materials for incorporation in casein compositions comprise high viscosity, resinous distillates obtained in the distillation of petroleum fractions containing substantial quantities of cyclic constituents. These resinous distillates may be substituted for a portion of the casein in the usual formulations of casein compositions, and may also be substituted for a part or all of the drying oils or equivalent materials which are used in certain types of casein compositions. We have found that casein compositions containing relatively large amounts of resinous distillates produce solid plastic forms having very satisfactory cohesion, adhesion, water resistance, and durability.

The resinous distillates which may be employed for this purpose may be obtained by the distillation of petroleum fractions which are highly aromatic or naphthenic in nature. Suitable distillates of this type may be obtained, for example, in the distillation of cracked residua or of solvent refined cracked residua as disclosed in U. S. Patent 2,029,288 of U. B. Bray. However, the most satisfactory resinous distillates are obtained in the vacuum distillation of extracts from the refining of petroleum oils by means of solvents which have selective solvent power for the cyclic constituents of such oils. Various resinous distillates of this type are described in U. S. Patent 2,201,466 of A. P. Anderson. Extracts obtained by the use of any of the known selective solvents, such as furfural, liquid sulfur dioxide, phenol, dichloro-ethyl ether, and the like, are suitable for the production of resinous distillates for use in the compositions of the present invention. We prefer, however, to employ distillates obtained as high-boiling fractions in the distillation, under high vacuum, of extracts obtained in the furfural refining of lubricating oil fractions.

The resinous distillates from any of the sources described above should have a 210° F. Saybolt Furol viscosity of at least 30 seconds, and preferably at least 40 seconds, for use in the compositions of the present invention. The following are typical resinous distillates which we have obtained in the vacuum distillation of furfural extracts of lubricating oil fractions, and which are suitable for use in casein compositions:

|  | Distillate No. 1 | Distillate No. 2 | Distillate No. 3 |
|---|---|---|---|
| Viscosity, S. F. 210° F | 35 | 120 | 184 |
| Gravity, A. P. I. ° | 10.6 | 9.1 | 8.3 |
| Melting point, B & R ° F |  |  | 95–110 |
| Paraffin content, percent | 0.4–0.8 | 0.4–0.8 | 0.4–0.8 |

By the use of high vacuum, it is possible to obtain distillates having 210° F. Saybolt Furol viscosities as high as 600 seconds, or even higher. However, under practical commercial conditions for vacuum distillation, the viscosity of the resinous distillates will usually range from 30 seconds to 300 seconds. We have found that a combined distillate of fractions having viscosities within this range, and in proportions such that the viscosity of the combined fractions is from 60 to 80 seconds, is very suitable for use in the compositions of the present invention.

A wide range of proportions of casein to the resinous distillate may be employed, depending upon the nature and use of the particular casein composition. Generally, however, it is desirable to employ a greater amount of casein than resinous distillate, and we prefer, in most cases, to use a ratio of at least two parts of casein to one part of resinous distillate. We prefer to use ratios of casein to resinous distillate not exceeding 9:1, and it is apparent that for greatest economy this ratio should be as low as possible without interfering with the desirable properties of the casein composition.

The resinous distillate may be incorporated in the casein composition in any convenient manner which will secure adequate dispersion. In the case of aqueous casein compositions, such as caseinate paints and adhesives, the resinous distillate may be directly incorporated and thoroughly dispersed in the aqueous composition. However, it is more desirable to emulsify the resinous distillate with the water and water-soluble components of the mixture prior to incorporating the casein. In the latter case, it may be neccessary to incorporate in the resinous distillate a small amount of emulsifying agent, such as cottonseed stearine pitch, in order to facilitate emulsification of the distillate. For other types of casein compositions, such as molding and extruding mixtures, the resinous distillate may be incorporated in the composition during the mixing, kneading, or extruding operations.

In any of the various types of casein compositions in which the resinous distillates are to be incorporated, the usual ingredients of the composition, such as solubilizing agents for the casein, hardening agents, pigments, dyes, and the like, may be employed. The proportions of ingredients such as solubilizing agents and hardening agents may be formulated in accordance with the casein content of the composition. Proportions of inactive ingredients, such as pigments, dyes, or other fillers, may be formulated on the basis of the total weight of the composition.

One of the most severe requirements for a component of a casein composition is its suitability for use in casein adhesives employed as bonding agents for waterproof plywood, and our invention will be illustrated with respect to such a composition.

An extract obtained in the furfural refining of a lubricating oil distillate was stripped of furfural and subjected to vacuum distillation under a vacuum of 29.0 to 29.5 inches of mercury. The final fractions, having 210° F. Saybolt Furol viscosities of 40 seconds or higher, were combined to yield a resinous material having a 210° F. Saybolt Furol viscosity of 75 seconds. An emulsion was prepared from 50 parts by weight of this resinous distillate, 250 parts by weight of water, 10 parts by weight of sodium hydroxide, and 1.5 parts by weight of cottonseed stearine pitch. Approximately 100 parts by weight of casein was then incorporated in the emulsion with thorough mixing to produce a homogeneous product. The resulting adhesive was used to bond 3/32" plies of red cedar. Two plies with grain at right angles were bonded under a pressure of 50 pounds per square inch for a period of 24 hours. Test pieces of the resulting plywood, two inches square, were then subjected to a water resistance test involving alternate 24 hour periods of immersion in water and drying at 125° F. After a period of five months of this cyclic test, there was no appreciable separation of the plies in any of the test pieces, and the water resistance was equal in all respects to similar test pieces prepared from a casein adhesive containing no resinous distillate. On the other hand, specimens of a commercial plywood included in the same test failed after two months, due to cracking and separation of plies.

It is to be understood, of course, that the above example is merely illustrative and does not limit the scope of our invention. As has previously been pointed out, the resinous distillates may be incorporated in any of the various types of casein compositions adapted to produce solid plastic forms. Resinous distillates from other types of petroleum fractions containing cyclic compounds may be substituted for the particular distillate of the above example, and various equivalent procedures may be used for incorporating the resinous distillates in the casein compositions. In general, it may be said that the use of any equivalents or modifications of procedure which would naturally occur to one skilled in the art is included in the scope of our invention. Only such limitations are to be imposed on the scope of our invention as are indicated in the appended claims.

We claim:

1. A casein-resin composition comprising casein and a resinous distillate obtained in the distillation of a petroleum fraction containing substantial quantities of cyclic constituents, said distillate having a 210° F. Saybolt Furol viscosity of at least 30 seconds, the ratio of casein to resinous distillate in said composition being sufficiently high to produce a solid plastic mass when said composition is free from volatile constituents.

2. A casein composition adapted for the production of solid plastic forms, comprising a major proportion of casein and a minor proportion of a resinous distillate obtained from the distillation of petroleum fraction, extracted by means of a solvent having selective solvent power for cyclic compounds, said distillate having a 210° F. Saybolt Furol viscosity of at least 30 seconds.

3. A casein adhesive, comprising a major proportion of casein and a minor proportion of a resinous distillate obtained in the distillation of a furfural-soluble petroleum fraction, said distillate having a 210° F. Saybolt Furol viscosity of at least 30 seconds.

4. A casein adhesive, comprising casein and a resinous distillate obtained in the vacuum distillation of a furfural extract of a petroleum fraction, said distillate having a 210° F. Saybolt Furol viscosity of at least 30 seconds, and the ratio of casein to said distillate ranging from 2:1 to 9:1.

5. A casein adhesive comprising casein and a resinous distillate obtained in the vacuum distillation of a furfural extract of a lubricating oil distillate, said resinous distillate having a 210° F. Saybolt Furol viscosity of 60 to 80 seconds, and the ratio of casein to resinous distillate ranging from 2:1 to 9:1.

EDWIN C. KNOWLES.
FREDERIC C. McCOY.